US009536260B2

(12) United States Patent
Zamer

(10) Patent No.: US 9,536,260 B2
(45) Date of Patent: Jan. 3, 2017

(54) BUSINESS COMMUNICATION SERVICE

(71) Applicant: PAYPAL, INC., San Jose, CA (US)

(72) Inventor: Kamal Zamer, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/674,730

(22) Filed: Mar. 31, 2015

(65) Prior Publication Data

US 2016/0292778 A1  Oct. 6, 2016

(51) Int. Cl.
*G06K 5/00* (2006.01)
*G06Q 30/06* (2012.01)
*G06Q 50/00* (2012.01)

(52) U.S. Cl.
CPC .......... *G06Q 30/0641* (2013.01); *G06Q 50/01* (2013.01)

(58) Field of Classification Search
USPC .................. 235/380, 383; 705/26.1, 27.1, 60
See application file for complete search history.

(56) References Cited

U.S. PATENT DOCUMENTS

| 8,824,647 | B2 * | 9/2014 | Lin .................... H04M 11/00 379/88.1 |
| 9,001,136 | B2 * | 4/2015 | Stevens, III ........... G06F 3/00 345/522 |
| 9,171,327 | B2 * | 10/2015 | Nallu .................. G06Q 30/0633 |
| 2010/0222025 | A1 * | 9/2010 | Bosan .................... G06Q 30/02 455/412.1 |
| 2011/0179018 | A1 * | 7/2011 | Lazaridis ............... G06Q 30/02 707/723 |

OTHER PUBLICATIONS

International Searching Authority, Search Report and Written Opinion of the International Searching Authority for PCT/US2016/025386 mailed May 20, 2016, 8 pages.

* cited by examiner

*Primary Examiner* — Ahshik Kim
(74) *Attorney, Agent, or Firm* — Haynes & Boone, LLP

(57) ABSTRACT

Methods, systems, and computer program products for providing business communication services are disclosed. A computer-implemented method may include detecting a communication initiated by a user, analyzing the detected communication to determine an intended recipient of the communication, determining whether the recipient is responsive to the communication, determining whether to provide visual information associated with the recipient to the user in response to the communication, analyzing one or more prior transactions involving the user and the recipient, identifying a reason that the user initiated the communication with the recipient, determining one or more preferences of the user to generate a personalized user interface comprising the visual information, generating the personalized user interface for the user comprising the visual information, and displaying the personalized user interface to the user in response to the communication, for example, when the recipient is unable to respond to the communication.

20 Claims, 7 Drawing Sheets

BUSINESS COMMUNICATION SERVICE

TECHNICAL FIELD

The present disclosure generally relates to computer systems and, more particularly, to providing business communication services using specialized beacon devices, the Internet, and user interfaces.

BACKGROUND

Small businesses generally include privately owned corporations, partnerships and sole proprietorships. In addition, a business may be classified as "small" based on one or more criteria, including employees, assets, sales, and profits. Examples of small businesses may include bakeries, delicatessens, hairdressers, barbers, spas, attorneys, accountants, restaurants, bed and breakfasts, photographers, small-scale manufacturers, online businesses, mom and pop stores, family-owned businesses, mechanics, tailors, handymen, home inspectors, and independent contractors. Many small businesses achieve great success and popularity. However, most small businesses generally do not have the resources or infrastructure, such as IVR systems and call answering systems, to provide continuous and immediate phone or web support during, before, and after business hours.

For example, at times every available employee may be busy helping existing customers. Also, unpredictable or unexpected scenarios, such as bad weather, employee scheduling, and variable customer demand can result in situations where a small business is occasionally understaffed. Further, some small businesses may choose not to hire additional support staff, for example, either to increase profits or to minimize losses. As a result, there are times when small businesses cannot immediately respond to phone calls, e-mails, or other communications received from potential customers, existing customers, and business partners.

Therefore, providing new and improved business communication services that allow small businesses and other merchants to better serve consumers and suppliers is of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
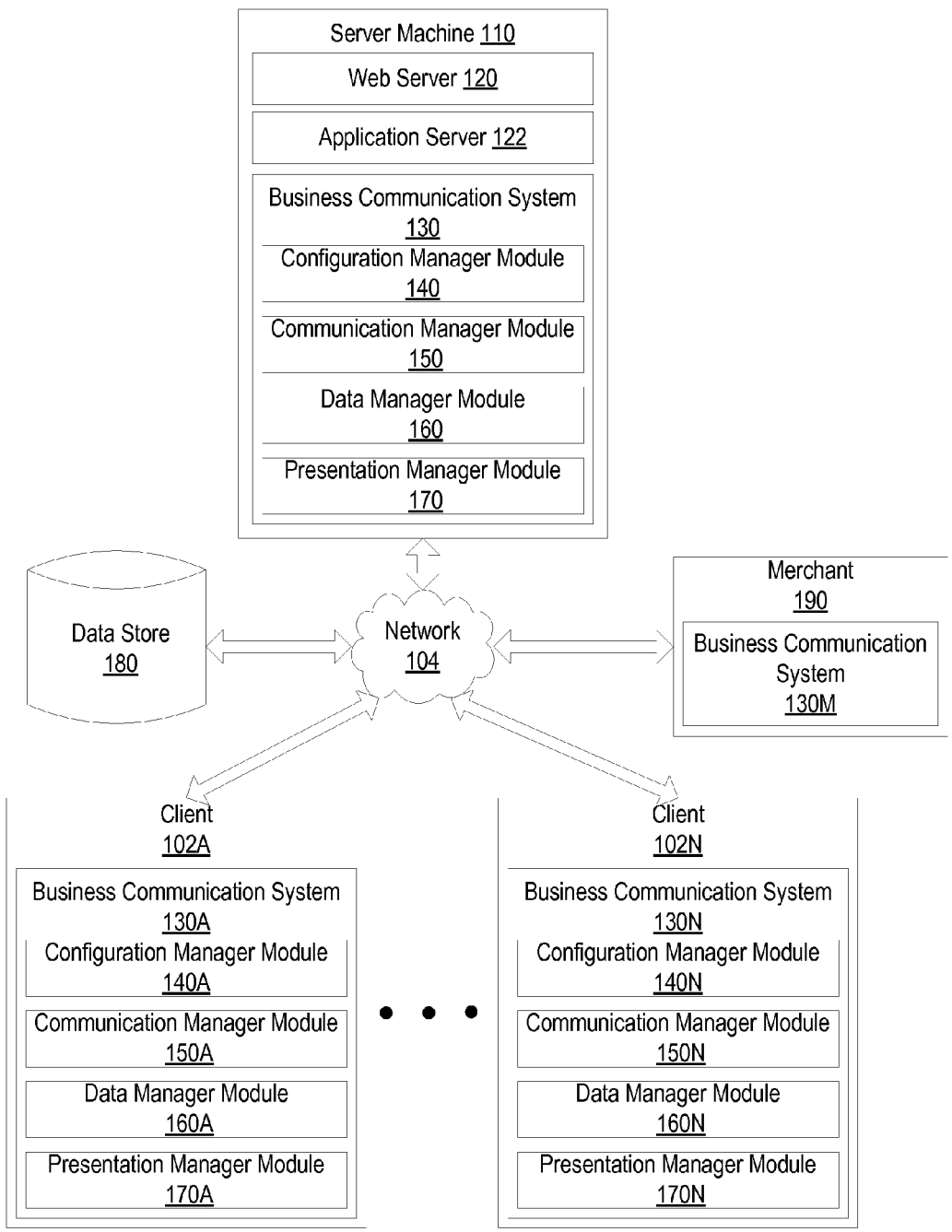
FIG. 1 is a block diagram illustrating a system architecture, in accordance with various examples of the present disclosure.

Systems, methods, and computer program products for providing business communication services are disclosed. In an example, a business communication system allows a merchant to display a personalized user interface generated for a user on a computing device in response to a user-initiated communication directed to the merchant.

In an example, a business communication system associated with an operating system or application running on a computing device, such as a mobile computing device, detects that a user is initiating a call or other communication. The business communication system then analyzes information associated with the call or other communication and determines whether the intended recipient uses a service providing personalized user interfaces for incoming communications.

In an example, the business communication system determines whether the merchant or other party is responsive to the call or other communication from the user. For example, the business communication system may determine that the merchant's line is busy or that the merchant is not answering the call. The business communication system then may determine whether to provide a personalized version of status information received from the merchant to the user for display on a computing device. For example, the business communication system may determine whether there is information from the merchant to provide to the user or whether the user wishes to display such information.

In an example, the business communication system analyzes information about the user to generate the personalized customer view of the merchant for the user. For example, the business communication system may analyze one or more transactions involving the user, one or more transactions involving the user and other parties, social media, other information associated with the user, transaction history with the merchant, search history with a recently purchased product or service from the merchant, and/or preferences indicated by the user. For example, the business communication system may analyze information associated with the user to determine what the user likes, dislikes, and generally considers important or unimportant. In another example, the system determines a likely purpose of the call by the user to the merchant, such as based on a recently purchased product or service, recent searches about a product or service, and/or emails to the merchant. The business communication system then uses such information to tailor a personalized customer view for the user by showing the user how well the merchant's offerings match or do not match the user's interests or by showing the user content the user may interested in, i.e., the reason the user is trying to contact the merchant.

In an example, the business communication system generates the personalized user interface for the user based on the user's preferences in view of various information provided by the merchant. For example, the personalized user interface may be generated based on real-time or near real-time information provided by the merchant. Such information may include product and service offerings available from the merchant, information about user transactions and other transactions processed by the merchant, and operational information provided by the merchant, such as information about other patrons, employees, efficiency, queues, delays, or other details about merchant location conditions.

In an example, the business communication system displays the personalized user interface comprising information from the merchant to the user in response to the user's communication. For example, the business communication system may display the personalized user interface to the user when the merchant is unable to respond to the communication. The personalized user interface also may be displayed on a user call with a merchant, for example, to facilitate communication between the user and a merchant representative.

Accordingly, aspects of the present disclosure facilitate the communication between merchants and a user even when the merchant is unavailable or unable to answer a communication from the user. For example, a graphical user interface comprising real-time or near real-time information tailored to the user's interests or reason for the call is displayed to the user to assist the user in locating the merchant and understanding how well the merchant is currently able to serve their needs, both operationally and based on product and service offerings, including information about products and services.

FIG. 1 illustrates an exemplary system architecture 100 in which examples of the present disclosure may be implemented. System architecture 100 includes one or more server machines 110, one or more data stores 180, one or more client machines 102A-102N, and one or more merchants 190 or other parties connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. In one example, network 104 may comprise a wireless telecommunications network (e.g., cellular phone network) adapted to communicate with other communication networks, such as the Internet. Network 104 also may include one or more short-range wireless networks or beacon networks.

A beacon generally refers to a short-range communication device having a known or fixed location. A beacon usually provides a signal that can be detected by mobile devices within a certain proximity of the beacon. Some types of beacons can detect the presence of other computing devices within range of the beacon and communicate with the other in-range computing devices. Further, some types of beacons can detect, collect, monitor, observe, and communication data about conditions of a location or physical environment accessible to the beacon.

Various types of beacons include, but are not limited to, radio frequency (RF) beacons (e.g., Bluetooth™ low energy (BLE) beacons), infrared beacons, and radio frequency identifier (RFID) tags. For example, BLE beacons may broadcast an RF signal that includes position coordinates (e.g., latitude, longitude, altitude), which can be detected by a mobile device. In some examples, a beacon also may advertise location-based services available on a beacon network. Generally, a beacon network usually encompasses a plurality of beacons in a geographic area.

In an example, when a mobile computing device first makes contact with a beacon in a beacon network, the beacon may transmit a list of unique identifiers of other beacons in the network and other information about the beacon network to the mobile computing device. Beacon networks may be located in any geographic area including businesses (e.g., shopping malls, retail stores, restaurants, etc.), landmarks (e.g., museums, airports, parks, entertainment venues, etc.), office buildings, government buildings, schools, universities, homes, and in any other environments where short-range communication and/or location-based services may be desired.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client machine 102A may be a personal computer (PC), laptop, mobile phone, tablet computer, server computer, wearable computing device, or any other type of computing device. Client machine 102A may run an operating system (OS) that manages hardware and software of the client machine 102A. A browser (not shown) may run on the client machines (e.g., on the OS of the client machines). The browser may be a web browser that can access content and services provided by web server 120, application server 122, or a combination of a web server 120 and an application server 122. Other types of computer programs and computer scripts also may run on client machine 102A.

Client machines 102A-102N each may include a respective business communication system 130A-130N that displays a personalized user interface to a user on a respective client machine 102A when merchant 190 or another party that the user is trying to contact (e.g., via telephone, web chat, voice chat, video chat, instant messenger, e-mail, text message, SMS message, tweet, social media message, or using any other communication medium) is unresponsive to the user's communication. For example, business communication system 130A running on a client machine 102A (e.g., as a software application, mobile application, operating system component, or other application, etc.) may determine whether to display a personalized view of data received from the recipient of the communication in response to the user's communication. The business communication system 130A then may display the personalized view comprising data received from the recipient when the recipient is unable to respond to the user's communication.

In some examples, a business communication system 130-130M may be provided to users by a merchant 190, by a third-party technology vendor, by a third-party payment processing provider, or generally any other party. Also, generally a business communication system 130-130M may be used to facilitate communications between two or more parties and is not specifically limited to interactions between merchants and consumers. For example, a person may wish to use a business communication system 130A to provide friends, family members, coworkers, or other individuals with a personalized visual message comprising information received from the person when that individual is unable to respond to a communication.

Server machine 110 and business communication system 130A-130M each include a respective configuration manager module 140-140M, communication manager module 150-150M, data manager module 160-160M, and presentation manager module 170-170M. In various examples, such modules may be combined, divided, and organized in various arrangements on one or more computing devices.

Merchants 190 generally refer to one or more parties that sell or otherwise provide products or services to various parties such as consumers, businesses, governments, non-profit organizations, etc. Merchants 190 generally may provide goods or services by having a physical presence, by operating online with a virtual presence, and/or with the assistance of one or more intermediate agents (e.g., brokers, handlers, shippers, etc.).

Server machine 110 may include one or more web servers 120 and application servers 122. Web server 120 may provide text, audio, image, and video content from server machine 110 or other sources (e.g., data store 180) to client machines 102A-102N. Web server 120 also may provide web-based application services, business logic, and updates to client machines 102A-102N. Client machines 102A-102N may locate, access, and consume various forms of content and services from web server 120 using applications, such as a web browser, web servers, and various other types of computer applications, etc. Web server 120 also may receive text, audio, video, and image content from client machines 102A-102N, which may be stored in data store 180 for preservation and/or sharing of content.

In an example, web server 120 is coupled to one or more application servers 122 that provide application services, data, business logic, and/or APIs to client machines 102A-102N. In some examples, application servers 122 also may provide such services to client machines 102A-102N without use of web server 120.

In an example, web server 120 may provide client machines 102A-102N with access to one or more application server 122 services associated with business communication system 130. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client machines 102A-102N may include an application associated with a service provided by server machine 110 (e.g., business communication system 130). For example, various types of computing devices (e.g., smart phones, smart televisions, tablet computers, smart wearable devices, smart home computer systems, etc.) may use applications to access services provided by server machine 110, to issue commands to server machine 110, and/or to receive content from server machine 110 without visiting or using web pages.

In an example, functions performed by server machine 110 also may be performed by client machines 102A-102N, in whole or in part. In addition, the functionality attributed to a particular component may be performed by different or multiple components operating together. Further, server machine 110 may be accessed as a service provided by systems or devices via appropriate application programming interfaces (APIs), and thus is not limited to use with websites.

For example, client machines 102A-102N and merchant 190 each may include a respective business communication system 130A-130M and/or one or more client modules of a respective business communication system 130A-130M for providing business communication services from a merchant 190 to a user. Further, server machine 110 may include a respective business communication system 130 and/or one or more server-based modules of a business communication system 130.

In an example, configuration manager module 140 of business communication system 130 generally enables merchant 190 or another party to establish, configure, update, maintain, and use a business communication service that provides a personalized view to users initiating communication with the merchant 190. In one example, merchant 190 provides information about its business when registering to use a business communication service. Merchant 190 also may provide such information when registering for one or more other services, such as payment processing services available from a payment processing provider.

In an example, merchant 190 provides a business name, contact information, unique contact identifiers (e.g., telephone numbers, e-mail addresses, account names, account handles, hashtags, etc.), one or more locations, business hours, descriptive information about a business, a listing of available products and services, and information about one or more operational aspects of the business. For example, merchant 190 may provide information about the operational capacity of a business location, such as a number of tables or seats, a number of check-in or check-out stations, a number of employees expected to be working at given times, a number of available work stations for employees to use, a number of customers or orders that generally can be processed in a period of time, etc. In some examples, merchant 190 may update such operational information periodically, as needed. In addition, operational information may be updated automatically for the merchant 190 based on transactional information collected for the merchant over time or operational characteristics detected or observed at a location of the merchant 190 (e.g., by beacon devices or computing devices associated with the merchant 190 location).

In an example, merchant 190 activates an available business communication service for responding to consumer communications when the merchant 190 is unavailable or unable to handle such communications. For example, the merchant 190 may activate a business communication service so that all incoming communications, incoming communications received during a scheduled or unscheduled period, or incoming communications received via one or more communication media are handled by the service.

In some examples, merchant 190 uses a business communication service to handle communications received after hours, during peak hours, when the merchant 190 steps out of the office, when available telephone lines are occupied, when the merchant 190 is too busy to respond, when the merchant prefers not to respond, instead of providing the user with a busy signal, instead of placing the user on hold, instead of sending the user to voicemail, instead of ignoring the user's communication, when the user chooses or prefers to use the business communication service instead of waiting on hold, or for other various reasons and situations. Merchant 190 also may choose to transfer each of one or more individual customer communications to a business communication service. Further, merchant 190 may flexibly schedule, activate and deactivate use of a business communication service as customer demands, staffing, and operations fluctuate.

In an example, communication manager module 150 of business communication system 130 detects and analyzes communications initiated by a user to determine a recipient of the communication and whether the recipient is using a business communication service to handle incoming communications. For example, communication manager module 150A running on client machine 102A may detect that a user has initiated a communication, such as a telephone call, video call, chat session, instant message, text message, SMS message, e-mail message, social media message, or tweet associated with merchant 190 based on a unique merchant 190 identifier (e.g., telephone number, e-mail, account name, account handle, hashtag, etc.). Communication manager module 150A also may monitor a state of the communication initiated by the user to determine whether the merchant 190 is responsive or unresponsive to the communication.

In an example, data manager module 160 of business communication system 130 generally performs data related analysis and tasks associated with a business communication service. For example, the data manager module 160 may search a database, directory service, or other type of data store 180 using a recipient identifier (e.g., telephone number, e-mail, account name, account handle, hashtag, etc.) to find an actual identity of the recipient. In one example, data manager module 160 then determines whether the recipient is registered to use a business communication system 130 for displaying a personalized customer view 210 to users in response to answered or unanswered communications.

In an example, data manager module 160 determines whether to provide a personalized customer view 210 to a user in response to a user-initiated communication. For example, data manager module 160 may determine whether the merchant 190 uses a business communication service, whether the merchant 190 has activated a business communication service to handle incoming communications, the status of a communication (e.g., busy, waiting, on hold, etc.), the status of the merchant 190 (e.g., out of office, unavailable, at lunch, busy, on vacation, closed, etc.), how long a user has been waiting to establish communication with the merchant 190 (e.g., rings, seconds, messages, etc.), whether the user has indicated a desire to display the personalized customer view 210, etc.

In an example, data manager module 160 receives transactional, operational and other data from merchant 190 for use in generating and providing a personalized customer view 210 to a user. For example, data manager module 160 may periodically receive transactional data updates, operational data updates, and other types of data from the merchant 190 for use in providing personalized customer views 210 for each respective user attempting to contact the merchant.

In an example, data manager module 160 determines one or more preferences of a user when generating the personalized customer view 210 of merchant 190 for the user. For example, data manager module 160 may analyze one or more transactions between the user and the merchant 190 or between the user and another party to determine preferences and interests of the user. Data manager module 160 also may locate and analyze other information about the user, such as information available on social networks, e-commerce websites, product review websites, e-mails, and other sources to determine likes and dislikes of the user. Data manager module 160 then may use such information to tailor the personalized customer view 210 according to products, services, and experiences that each user finds interesting and of value.

In an example, presentation manager module 170 of business communication system 130 generates a personalized user interface for a user that has initiated communication with merchant 190. For example, presentation manager module 170A may generate a personalized customer view 210 for a user that is attempting to contact the merchant 190. Presentation manager module 170A then displays the generated personalized customer view 210 on the client machine 102A used to initiate the communication. In some examples, presentation manager module 170A displays the personalized customer view 210 when the merchant 190 is unresponsive or unable to receive the user-initiated communication.

In some examples, presentation manager module 170A may provide the personalized customer view 210 to a user when the merchant 190 answers the communication. For example, the personalized customer view 210 may be provided to the user for an active conversation or other bidirectional communication with the merchant 190, allowing the user to reference details about the merchant 190, an account, or a relationship with the merchant 190 while actively engaging with the merchant 190 (e.g., to facilitate communication between the user and a representative of the merchant 190).

In an example, presentation manager module 170A displays the personalized customer view 210 automatically, without user-provided input, confirmation, acceptance, navigation, or instruction. For example, presentation manager module 170A may display the personalized customer view 210 automatically when merchant 190 is unresponsive to a communication from the user, based on status information associated with the merchant 190 (e.g., busy, unavailable, closed, etc.), when connecting to a representative from the merchant 190 (before, during, or after), and in other situations.

In an example, presentation manager module 170A, displays the personalized customer view 210 to the user by adjusting the display of client machine 102A from a communications-oriented user interface to the personalized customer view 210 comprising information provided by the merchant 190. For example, the personalized customer view 210 may include merchant-provided status information and one or more operational metrics associated with current or recent business at a location of the merchant 190.

In some examples, the personalized customer view 210 allows the user to make a payment to the merchant 190. For example, the personalized customer view 210 may redirect the user to a dedicated payment user interface or allow the user to enter and submit payment information directly without leaving the personalized customer view 210. Further, one or more aspects of the personalized customer view 210 may be determined based on location information received from a global positioning device associated with a client machine 102A. For example, such location information may be used to automatically select the closest merchant 190 location to the user and provide real-time navigation and travel time to the merchant 190 from the user's present location.

Figure 2A:
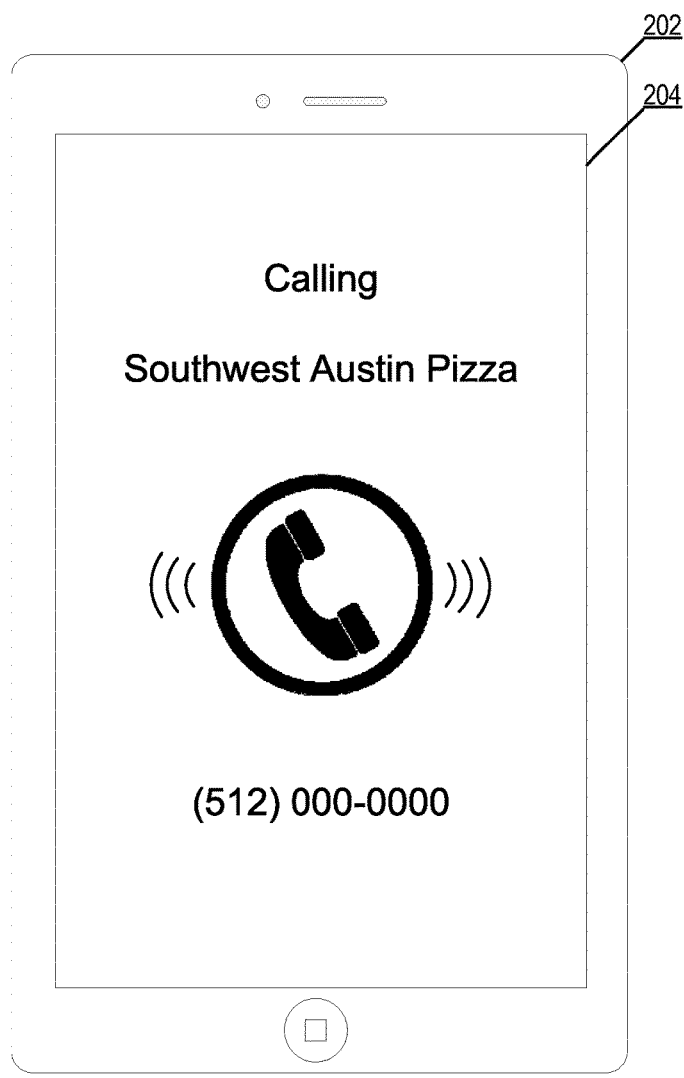
FIG. 2A is a diagram illustrating an example user interface indicating that a user has initiated a call to a merchant, in accordance with various examples of the present disclosure.

FIG. 2A is a diagram 200A illustrating an example user interface 204 indicating that a user has initiated a call to a merchant, in accordance with various examples of the present disclosure. In an example, the user first initiates a communication intended for a recipient using a client machine 102A. For example, the user may initiate the communication on a mobile computing device 202 using a graphical user interface to initiate communications, such as a telephone application, messaging application, keyboard, numeric touchpad, voice command, or any other type of software application for initiating communications with another party.

In an example, the user may select or input a unique identifier using the graphical user interface for communications to indicate the intended recipient of the communication. A software application running on the mobile computing device 202 then may initiate the communication on behalf of the user and present the user with another user interface 204 indicating that the communication has been initiated, sent, delivered, or otherwise communicated to the intended recipient. In general, communications may include, but are not limited to telephone calls, web chats, voice chats, video chats, instant messenger sessions, e-mail, text messages, SMS messages, tweets, social media messages, etc.

Figure 2B:
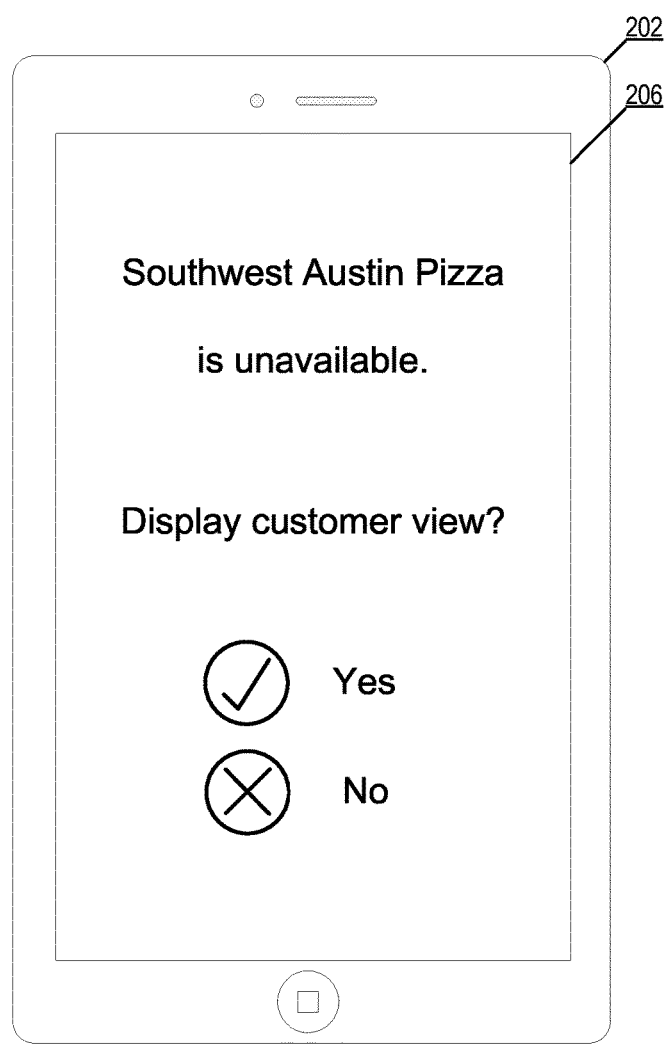
FIG. 2B is a diagram illustrating an example user interface for transitioning a user from a communication interface to a customer view of a business communication service, in accordance with various examples of the present disclosure.

FIG. 2B is a diagram 200B illustrating an example user interface 206 for transitioning a user from a communication interface to a personalized customer view 210 of a business communication service, in accordance with various examples of the present disclosure. In an example, business communication system 130A running on client machine 102A detects that a recipient of a user's communication is unable to respond to the communication. For example, a call may go unanswered after a predetermined number of rings, a message may go unanswered after predetermined amount of time, the recipient may be unavailable or may choose not to join the communication session, or the recipient's status or configuration preferences indicate unavailability of the recipient.

In an example, the business communication system 130A determines that the recipient of a communication initiated by a user is unable to respond to the communication. Business communication system 130A then presents a user interface 206 on the mobile computing device 202 to transition the user from a communication interface to a personalized view of information received from the recipient. For example, the user interface 206 may indicate that the recipient of the communication is unavailable and asks whether the user wishes to display the personalized customer view 210 from the recipient. The user then may accept or decline the opportunity to display the personalized customer view 210.

In an example, a user accepting the opportunity is transitioned to the personalized customer view 210, and a user that declines the opportunity may be directed to a prior communication interface used to initiate communication. In some examples, the display on the mobile computing device is automatically transitioned from a user interface for communications or a user interface indicating that communication has been initiated directly to a personalized customer view 210 for the user without user input when the recipient is unresponsive to the communication.

Figure 2C:
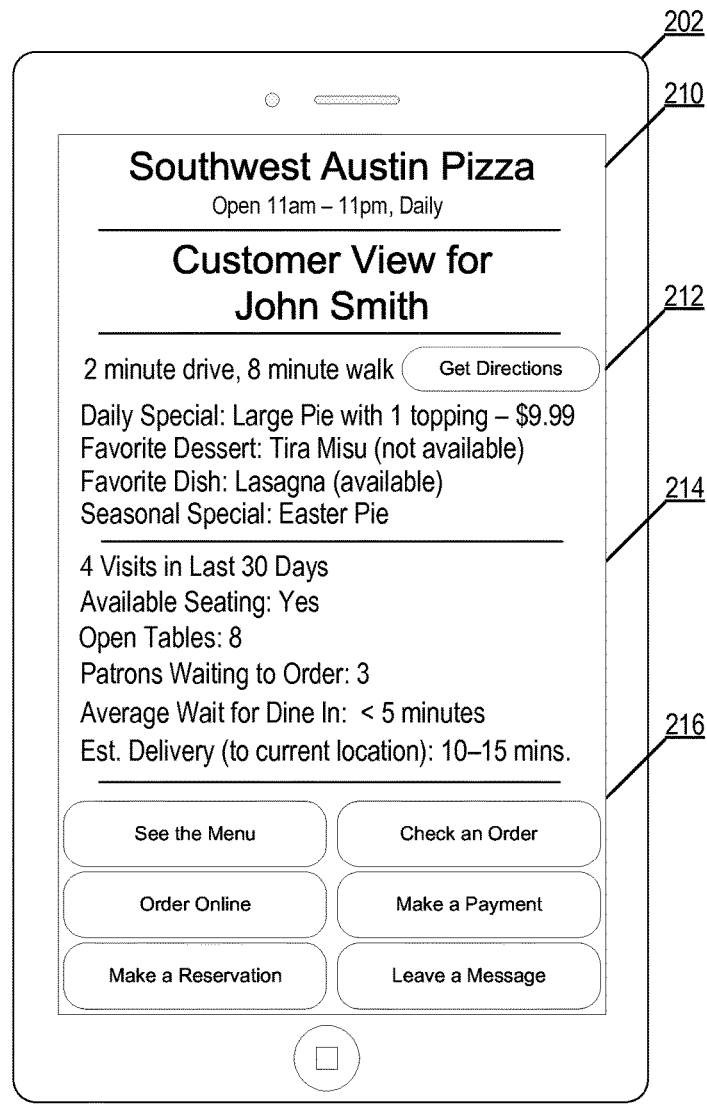
FIG. 2C is a diagram illustrating an example user interface for a personalized customer view from a business communication service provided in response to a communication from a user, in accordance with various examples of the present disclosure.

FIG. 2C is a diagram 200C illustrating an example user interface for a personalized customer view 210 from a business communication service provided in response to a communication from a user, in accordance with various examples of the present disclosure. In an example, a personalized user interface comprising information received from the recipient of a communication is displayed on the mobile device 202 of the user. For example, the display of the mobile device 202 may be automatically or manually transitioned to a personalized customer view 210 for the user when the recipient is unable to respond to a communication from the user.

In an example, the personalized customer view 210 displayed to the user when the merchant 190 is unavailable may include general information about the merchant 190, such as the merchant 190 name, hours of operation, provided services, business category, and other information. The personalized customer view 210 also may include personal information about the user, such as the user's name, last transaction, etc.

In an example, the personalized customer view 210 comprises a plurality of sections, such as a first section 212 integrating products and services of the merchant 190 with preferences and interests of the user. The personalized customer view 210 also may include a second section 214 that provides the user with operational information received from the merchant 190 to help the user determine whether or when to utilize services provided by the merchant 190. The personalized customer view 210 further may include a third section 216 that allows the user to perform one or more actions associated with the merchant 190. Other various organization, arrangements, and personalization may be provided to a user in the personalized customer view 210, including informational content and links that are based on what the system thinks the user is calling about. This can be based on information about a recent purchase from merchant, an email to the merchant, searches by the user related to a service or product offered by or recently purchased from the merchant, postings on social networks about an item or service that the merchant offers, etc.

In an example, user interface section 212 provides the user with estimated travel times and directions to the merchant 190 location based on GPS location information received from the mobile computing device 202. User interface section 212 also provides daily special information received from the merchant 190, information about whether the merchant 190 offers or is able to provide the user's favorite products, and seasonal specials or other non-standard offerings provided by the merchant 190.

In an example, user interface section 214 provides the user with information about previous visits to the merchant 190 and operational information received from the merchant 190. In various examples, such information may be provided by the merchant 190 based on observations of operations at a location, based on transactional processing such as payment records or orders associated with the merchant 190, or beacon devices or computing devices that monitor operations and activity of location.

In an example, user interface section 214 provides the user with operational information about the merchant 190 indicating whether there is seating availability, whether the merchant 190 is able to provide service to the user, and average expected wait times for various types of services offered by the merchant.

In an example, the merchant 190 may provide operational information and other data about their business at regular periodic intervals, at times when new information is available, at times when the merchant 190 is able to provide information, at times when a change is detected in operational information at the merchant 190 location, in response to requests, or generally at any other time, frequency, or interval. In an example, operational information received from the merchant 190 may be provided to the user in real-time, in near real-time (e.g., in under a second, in a few seconds, under a minute, etc.), or with delay. Further, the operational information provided to the user may be periodically refreshed automatically or in response to a user request.

In an example, user interface section 216 allows the user to perform one or more actions associated with the merchant 190. For example, user interface section 216 provides links or controls that allow the user to display additional menu information, check on existing orders or service, place new orders or requests, make a payment to the merchant 190, schedule a reservation or appointment, and leave a message for the merchant 190 (e.g., voice, text, video, image, or any other type of message).

In an example, the merchant 190 is provided with a merchant view that includes information about each communication received by the merchant 190. For example, the merchant view may include information about each customer that contacted the merchant or left a message for the merchant. In some examples, the merchant view displayed to a merchant 190 indicates one or more of how long a user has been a customer, transaction history between the customer and the merchant 190, a history of the customer's communications with the merchant 190, the customer's preferences, an average amount spent by the customer for each purchase, an average profit earned from each purchase of the customer, a loyalty rating for the customer, a profitability rating for the customer, a transaction frequency for the customer, etc.

Figure 3:
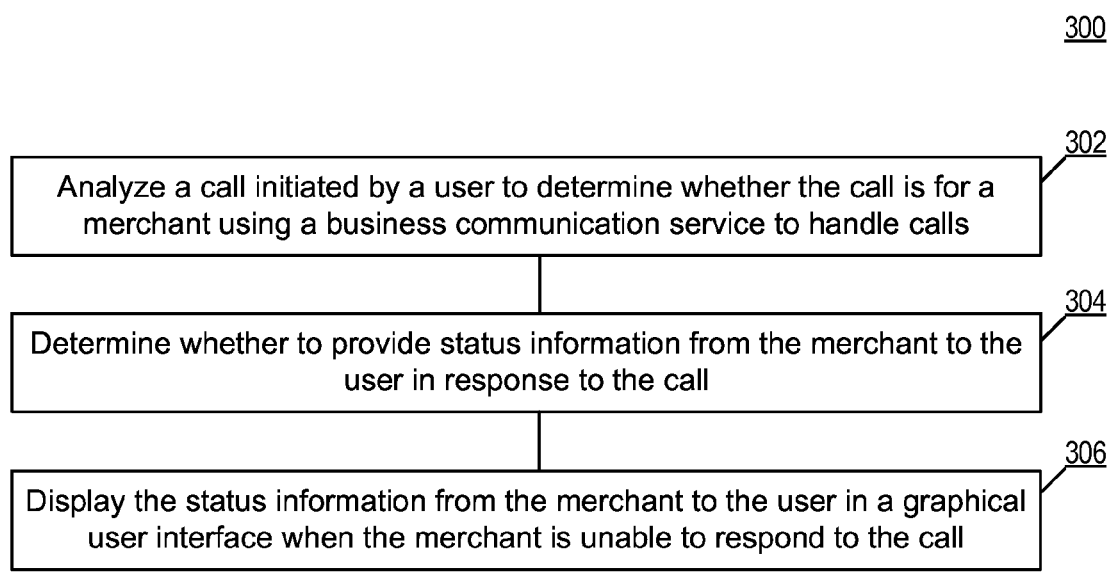
FIG. 3 is a flow diagram for providing a business communication service, according to an example of the present disclosure.

FIG. 3 is a flow diagram for providing a business communication service, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 300 are described with respect to business communication system 130A for the sake of consistency. Such examples also generally apply to other business communication system 130, 130N, 130M examples described herein.

Method 300 begins at block 302 when communication manager module 150A of business communication system 130A analyzes a call initiated by a user to determine whether the call is for a merchant that uses a business communication service for incoming calls. In an example, communication manager module 150A detects that a user has initiated to call to another party. In response, communication manager module 150A analyzes information associated with the call, such as a telephone number, address book information, contact information, or other available information to identify the party receiving the call.

In an example, communication manager module 150A locates a unique identifier for the recipient such as the destination telephone number for the call, and searches one or more data stores 180 to determine whether the recipient is registered to use a business communication service for answering calls. In one example, communication manager module 150A determines that the intended recipient of a call is merchant 190 that uses an online business communication service to handle incoming calls.

At block 304, data manager module 160A of business communication system 130A determines whether to provide status information from the merchant 190 to the user in response to the call. In an example, data manager module 160A analyzes one or more configuration settings provided by the merchant 190 to determine whether the merchant 190 has enabled the business communication service to handle incoming calls. For example, the merchant may indicate that new incoming calls, after-hours calls, or calls that are unanswered after a number of predetermined rings are to be handled by a business communication service. Data manager module 160A also may analyze one or more communication systems associated with the merchant 190 to determine whether the merchant 190 is able to accept incoming calls (e.g., based on a number of open or available telephone lines).

In an example, data manager module 160A determines that an incoming call to the merchant 190 is to be handled by a business communication service that displays personalized customer views 210 comprising information received from the merchant 190 in response to calls the merchant does not answer. For example, data manager module 160A may determine that configuration data indicates that new calls for the merchant 190 are to be handled by the business communication service. Data manager module 160A also may determine that an incoming call is to be handled by the business communication service when one or more predetermined criteria are met. For example, an incoming call for the merchant 190 may be handled by the business communication service after three rings, after an amount of time, when a line is busy, when a user is on hold for a period of time, and in other scenarios.

At block 306, presentation manager module 170A of business communication system 130A displays the status information from the merchant 190 to the user in a graphical user interface when the merchant 190 is unable to respond to the call. In an example, presentation manager module 170A generates and displays a personalized customer view on the computing device of a user that initiated a call to the merchant 190. For example, presentation manager module 170A may display a personalized customer view in response to a merchant request or based on a determination that the merchant 190 is unable to or prefers not to answer an incoming call.

In an example, presentation manager module 170A, displays a personalized customer view of merchant 190 information to the user by adjusting a client machine 102A display from a communications-oriented user interface associated with initiation of a communication to a personalized customer view (e.g., personalized customer view 210) comprising transactional, operational, and/or other types of information provided by the merchant 190. For example, a personalized customer view may include information about how closely merchant 190 offerings match user preferences, current or previous transactions between the user and the merchant 190, and current or recent operational information indicating how quickly or efficiently the merchant is able to provide service to the user at a location.

Figure 4:
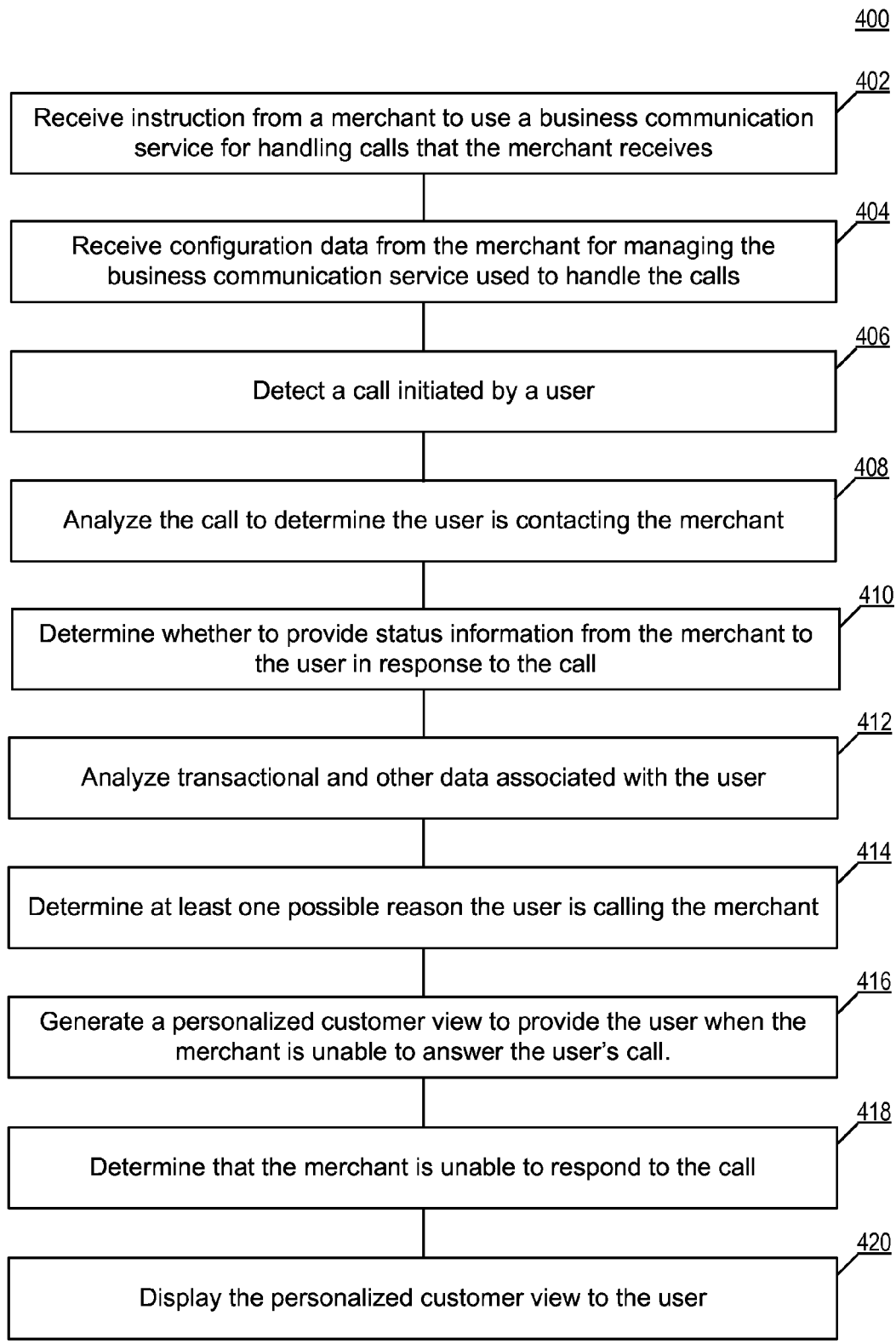
FIG. 4 is a flow diagram for providing a business communication service using one or more types of available information, according to an example of the present disclosure.

FIG. 4 is a flow diagram for providing a business communication service using one or more types of available information, according to an example of the present disclosure. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 400 generally are described with respect to business communication systems 130 and 130A for the sake of consistency. Such examples also generally apply to other business communication system 130N, 130M examples described herein.

Method 400 begins at block 402 when configuration manager module 140 of business communication system 130 receives instruction from a merchant 190 to use a business communication service for handling calls received by the merchant 190. In an example, merchant 190 updates configuration information or sends a message to business communication system 130 to activate a business communication service for responding to incoming user communications.

For example, the merchant 190 may activate the business communication service to handle the user communications when the merchant 190 is unavailable or becomes unable to handle communications. In some examples, the merchant 190 may activate a business communication service so that each incoming communication received during a scheduled or unscheduled period of time, or each incoming communication received via one or more communication media are handled by the business communications service.

At block 404, configuration manager module 140 of business communication system 130 receives configuration data from the merchant 190 for managing the business communication service used to handle the calls. In an example, the merchant 190 provides configuration information and other information for use in providing each user with a personalized customer view 210 of the merchant 190. For example, the configuration information provided by the merchant 190 may include data indicating when and how a business communication service is to respond to incoming user communications.

In an example, the merchant 190 also may provide configuration information about one or more beacon devices and/or computing devices at merchant 190 locations. For example, the merchant 190 may use beacon devices and computer devices at one or more locations to detect the presence of employees, the presence of customers, the operational environment, operational efficiency, total capacity for serving users, remaining capacity for serving users, etc. Such information may be collected, analyzed, and used to guide the merchant 190, existing customers, or potential customers when making decisions.

In an example, the merchant 190 provides various information to configuration manager 140 for use in creating and displaying personalized customer views 210 to users. For example, the merchant 190 may first provide general business information, contact information, hours, and location information for one or more merchant 190 locations. Such general information may be provided and updated by the merchant 190 generally at any time.

In an example, the merchant 190 also provides information about products and services that users are able to receive from the merchant 190. For example, the merchant 190 may provide inventory information, service information, pricing information, availability information, and other information to guide users in their decision-making.

In an example, the merchant 190 also provides operational information associated with a business location. For example, the merchant 190 may indicate a number of seats, tables, service bays, chairs, cash registers, fitting rooms, employees, or other units associated with providing service to customers. In some examples, the merchant 190 may associate a beacon device or a computing device with individual units or spaces (e.g., locations, or areas) within the business that detect and monitor activities being performed at the respective units or spaces. In other examples, the merchant may associate a single beacon device or computing device to detect and monitor activities of multiple units or spaces of the business.

In an example, a beacon device or a computing device monitors a unit (e.g., seat, table, service bay, chair, cash register, fitting room, employee, etc.) or space (e.g., location, area, etc.) to determine whether the unit or space is ready for use or is in use. For example, the beacon device or the computing device may detect based on familiar or unfamiliar mobile computing devices, the presence or absence of an employee near or in a unit or space, the presence or absence of a customer near or in a unit or space, the presence or absence of an object or other computing device near or in a unit or space (e.g., a vehicle being serviced at a service bay), and the presence of both a customer and an employee near or in a unit or space.

In an example, the beacon device or the computing device also may monitor a period of time that an employee and/or customer is present at a unit or space. Such information may be analyzed with prior and current transactional information of the merchant 190 to determine a number of patrons at a merchant 190 location, availability or unavailability of service at a merchant 190 location, estimated wait times for customers, estimated service times for customers, and other information to help merchants 190 and users make more informed decisions based on current conditions at location of the merchant 190.

In an example, data collected from beacon devices and/or computing devices at a merchant 190 location may be used over time to learn information about the merchant's business. Such information may include, times of understaffing, times of overstaffing, better employee utilization, employee efficiency, team efficiency, operational efficiency of the business, busy periods, slow periods, employee throughput, time to service an average customer, time to service a specific customer, etc. In some examples, such information and other associated information can be used by the merchant 190 or business communication system 130 to improve (or suggest improvements for) business operations of the merchant 190.

At block 406, communication manager module 150A of business communication system 130A detects a call initiated by a user. In an example, communication manager module 150A, running on a mobile computing device 202 of a user, detects that the user has initiated a call with another party. For example, communication manager module 150A may monitor one or more software applications or communication interfaces (e.g., network devices) to determine when a user is initiating communication with another party. In an example, a software application or communication interface also may provide an indication to communication manager module 150 indicating initiation of a communication by a client machine 102A.

At block 408, communication manager module 150A of business communication system 130A analyzes the call to determine that the user is attempting to contact the merchant 190. In an example, communication manager module 150A analyzes a communication initiated by a user to locate information identifying a recipient of the communication. For example, communication manager module 150A may locate a telephone number or other unique identifier of the recipient. The unique identifier then may be used to search a database, directory service, or other type of data store 180 to determine an actual identity of the recipient. In one example, communication manager module 150A uses a telephone number from an initiated call to determine that the call is directed to a merchant 190 using a business communication service to display personalized customer views 210 to callers in response to their communications.

At block 410, data manager module 160A of business communication system 130A determines whether to provide status information from the merchant 190 to the user in response to the call. In an example, data manager module 160A determines whether to provide status information from the merchant 190 to the user in response to a communication based on one or more reasons. For example, data manager module 160A may first determine whether the merchant has activated a business communication service to handle incoming or overflow calls. Data manager module 160A also may determine whether the merchant 190 has provided current, recent, or any status information for display to users. Further, data manager module 160A also may determine whether the user wishes have the status information provided by the merchant 190 displayed on their computing device. For example, the user may indicate a preference or provide a selection indicating whether a personalized customer view 210 for the merchant 190 is to be displayed on their mobile computing device 202 in response to calling the merchant 190.

At block 412, data manager module 160A of business communication system 130A analyzes transactional data and other data associated with the user. In an example, data manager module 160A analyzes information about the user to determine likes and dislikes of the user. For example, data manager module 160A may be associated or integrated with a payment processing service provider that provides access to purchase and payment information of the user. In one example, transactions between the user and the merchant 190 or other parties may be analyzed to determine one or more types of food, products, services, activities, locations, subject matter, computing devices, clothes and other things that the user generally prefers, uses, or needs. Such information also may be determined by analyzing other information available for the user. For example, user preferences may be determined by analyzing social networking information or other information that the user has provided on the Internet (e.g., text, images, video, product reviews, product registries, etc.). In general, such information learned about the user may be used to tailor a personalized customer view 210 displayed to a user.

At block 414, data manager module 160A of business communication system 130A determines at least one possible reason that the user is calling the merchant 190. In an example, data manager module 160A analyzes transactional data involving the user and the merchant 190 to determine one or more suspected or actual reasons for the user initiating the call to the merchant 190. For example, data manager module 160A may identify a recent purchase, pending order, upcoming appointment, current bill, account annotation, or one or more other various reasons that a user may be calling the merchant. In some examples, data manager module 160A may determine a reason for the user's call based on other types of data, such as events scheduled on a user's calendar, a location of the user, a time of day, the nature of the merchant's business, tendencies of the user (e.g., oil changes every three months, haircuts every three weeks, etc.).

At block 416, presentation manager module 170A of business communication system 130A generates a personalized customer view 210 to provide the user when the merchant 190 is unable to answer the user's call. In an example, presentation manager module 170A generates a personalized customer view 210 for the merchant 190 to provide to the user in response to a communication. For example, presentation manager module 170A may use information determined from transactions of the user, online behavior and participation of the user, preference information received from the user, business information provided by the merchant 190, and operational information provided by the merchant 190 to generate a personalized customer view 210 for each of one or more users in communication with the merchant 190.

In an example, the personalized customer view 210 generated by presentation manager module 170A may display whether the merchant 190 provides, does not provide, or temporarily can or cannot provide specific products or services of interest to the user. The personalized customer view 210 generated by presentation manager module 170A also may include operational information from the merchant 190, such as a current number of patrons at a merchant 190 location, overall merchant 190 capacity, remaining merchant 190 capacity, expected wait times, etc.

At block 418, communication manager module 150A of business communication system 130A determines that the merchant 190 is unable to respond to the call. In an example, communication manager module 150A determines that the merchant 190 is not available based on a merchant status (e.g., out of office, unavailable, at lunch, busy, on vacation, closed, etc.). Communication manager module 150A also may determine that the merchant 190 is unable to respond to a user call based on a configuration setting set by the merchant 190. Further, communication manager module 150A may determine that the merchant 190 is not responding to the user's communication within a period of time or within a predetermined number of attempts (rings, unanswered messages, a number of attempts by the user to initiate a text, voice, video, or other session, etc.).

At block 420, presentation manager module 170A of business communication system 130A displays the personalized customer view 210 to the user. For example, presentation manager module 170A may display a personalized customer view 210 generated for the user, which comprises one or more of general information, transactional information, operational information, product/service information, and available customer actions from the merchant 190. In one example, the personalized customer view 210 is displayed by a mobile application running on mobile computing device 202. Personalized customer view 210 also may be displayed by an operating system, by a web browser, or by any other type of software application.

In some examples, the personalized customer view 210 may be offered or automatically provided to a user initiating communication with the merchant 190 when the merchant 190 is unable to respond to the user's communication. In other examples, the personalized customer view 210 may be offered or automatically provided to the user when the merchant is able to respond to the communication. For example, the merchant 190 may provide the personalized customer view 210 to customers to help facilitate customer communications with an employee or other merchant 190 business representative.

In an example, presentation manager module 170A, displays the personalized customer view 210 to the user automatically, based on user preference, or based on user instruction by adjusting the display of client machine 102A from a communications-oriented or other user interface to the personalized customer view 210. In some examples, the personalized customer view 210 indicates that the user owes a due or past due payment to the merchant 190. Further, the personalized customer view 210 may allow the user to make a payment directly from the personalized customer view 210 by entering and submitting a payment method and amount, entering and submitting a payment amount for a stored payment method, or clicking a button or other control to submit payment for an exact amount using a stored payment method.

Figure 5:
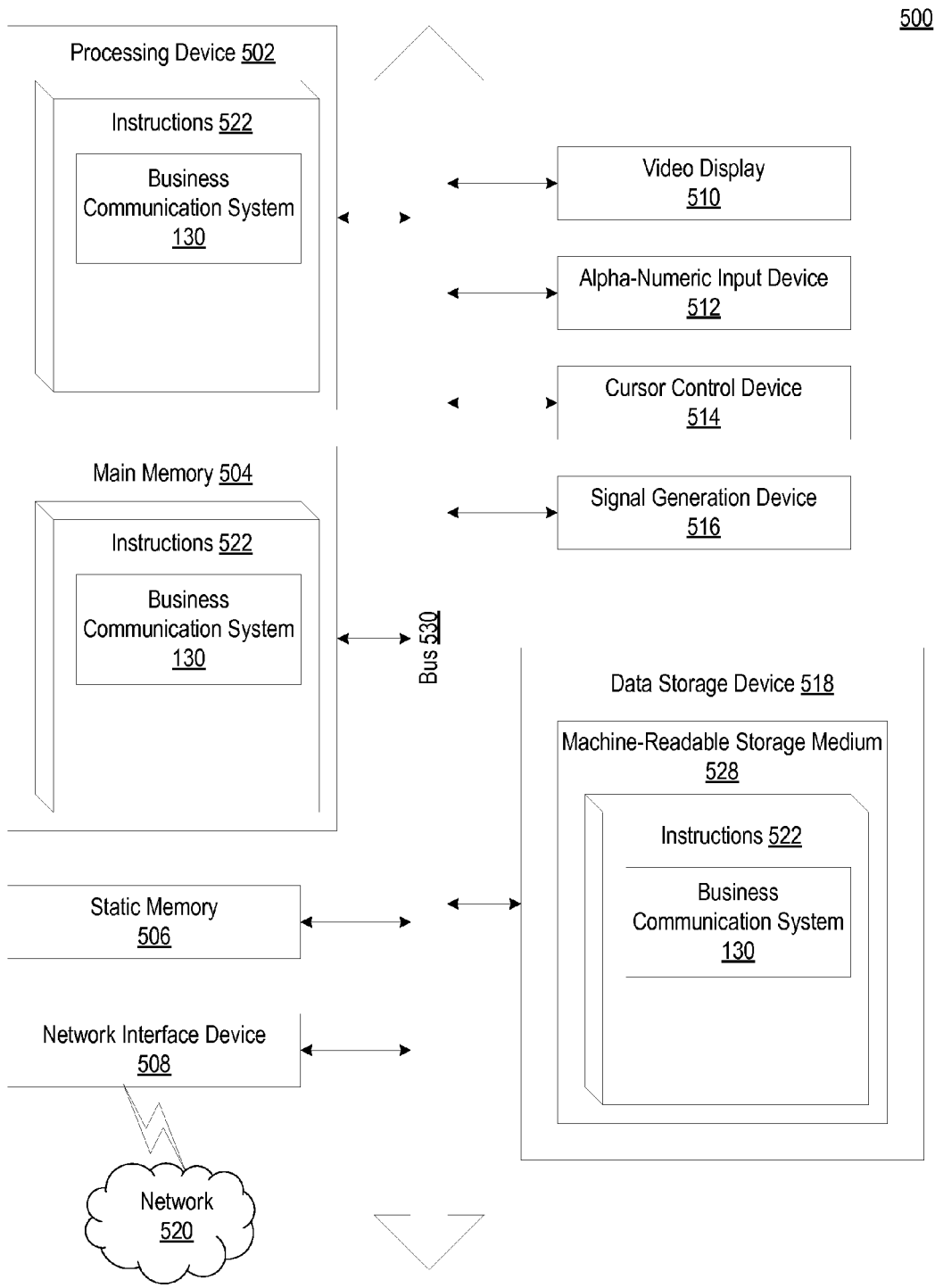
FIG. 5 is a block diagram of an exemplary computer system that may perform one or more of the operations described herein.

FIG. 5 illustrates a diagram of a machine in the exemplary form of a computer system 500, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 also may be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 also may include a network interface device 508. The computer system 500 may further include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software computer instructions) embodying any one or more of the methodologies or functions described herein. The instructions 522 also may reside, completely or at least partially, within the main memory 504 and/or within the processor 502 during execution thereof by the computer system 500, the main memory 504 and the processor 502 also constituting computer-readable storage media. The instructions 522 may be transmitted or received over a network 520 via the network interface device 508.

In one example, the instructions 522 include instructions for one or more modules of a customer management system (e.g., business communication system 130 of FIG. 1) and/or a software library containing methods that call a business communication system 130. While the computer-readable storage medium 528 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
   a non-transitory memory; and
   one or more hardware processors coupled to the non-transitory memory and configured to read instructions from the non-transitory memory to cause the computer system to perform operations comprising:
   analyzing, by one or more of the hardware processors, a communication initiated by a user to determine a recipient of the communication;

determining, by one or more of the hardware processors, whether to provide visual information associated with the recipient to the user in response to the communication; and providing, by one or more of the hardware processors for display on a computing device of the user, a user interface comprising the information associated with the recipient at least in part based on the communication initiated by the user, wherein the user interface allows the user to make a payment to the recipient.

2. The computer system of claim 1, wherein the operations further comprise:

determining that the recipient is unresponsive to the communication from the user.

3. The computer system of claim 1, wherein the operations further comprise:

determining one or more preferences of the user for generating the user interface.

4. The computer system of claim 1, wherein the operations further comprise:

generating the user interface comprising the information associated with the recipient.

5. The computer system of claim 1, wherein the user interface is provided for automatic display on the computing device of the user.

6. The computer system of claim 1, wherein the user interface is provided when the recipient is unresponsive to the communication from the user.

7. The computer system of claim 1, wherein the user interface is provided based on a status of the recipient.

8. The computer system of claim 1, wherein the operations further comprise:

displaying the user interface comprising the information associated with the recipient on the computing device of the user.

9. The computer system of claim 8, wherein the displaying comprises transitioning the user from a communication interface to the user interface associated with the recipient.

10. The computer system of claim 1, wherein the operations further comprise:

receiving an instruction from the recipient to use a communication service to display status information provided by the recipient to the user when the recipient is unresponsive to a communication from the user.

11. The computer system of claim 1, wherein the operations further comprise:

receiving information from the recipient to provide to the user.

12. The computer system of claim 11, wherein the information received from the recipient comprises data collected from one or more beacon devices associated with the recipient.

13. The computer system of claim 11, wherein the information received from the recipient comprises data collected from one or more beacon devices at a location associated with the recipient.

14. The computer system of claim 1, wherein the operations further comprise:

determining a reason that the user initiated the communication with the recipient.

15. The computer system of claim 14, wherein the reason is determined based on a purchase associated with the user.

16. The computer system of claim 14, wherein the reason is determined based on a search performed by the user.

17. The computer system of claim 14, wherein the reason is determined based on a social networking post associated with the user.

18. The computer system of claim 1, wherein the information provided for display on the computing device of the user is based on, at least in part, location information associated with a global positioning system (GPS) device in communication with the computing device of the user.

19. A non-transitory machine-readable medium having stored thereon machine-readable instructions executable to cause a machine to perform operations comprising:

analyzing a communication initiated by a user to determine a recipient of the communication;

determining whether to provide visual information associated with the recipient to the user in response to the communication; and providing a user interface comprising the information associated with the recipient in response to the communication initiated by the user, wherein the user interface allows the user to send a payment to the recipient.

20. A computer-implemented method, comprising:

analyzing, by one or more processing devices, a communication initiated by a user to a merchant, the communication being initiated from a computing device of the user;

determining, by one or more of the processing devices, whether to provide visual information associated with the merchant to the user in response to the communication; and displaying, by one or more of the processing devices, the information associated with the merchant to the user in a graphical user interface on the computing device of the user when the merchant is unresponsive to the communication, wherein the user interface allows the user to make a payment to the recipient.

* * * * *